United States Patent

Kawai et al.

[11] Patent Number: 5,050,892
[45] Date of Patent: Sep. 24, 1991

[54] SEALING ARRANGEMENT FOR PISTON IN COMPRESSOR

[75] Inventors: Katsunori Kawai; Hayato Ikeda; Naoya Yokomachi; Kazuhiro Tanikawa, all of Kariya, Japan

[73] Assignee: Kabushiki Kaisha Toyoda Jidoshokki Seisakusho, Aichi, Japan

[21] Appl. No.: 490,730

[22] Filed: Mar. 8, 1990

[30] Foreign Application Priority Data

Mar. 9, 1989 [JP] Japan ............................ 1-26977[U]

[51] Int. Cl.⁵ .............................................. B65D 53/00
[52] U.S. Cl. ..................................... 277/168; 277/27; 277/174; 277/177; 277/208
[58] Field of Search ................ 277/27, 168, 170, 171, 277/173, 174, 177, 205, 210, 212 C, 216, 165, 208

[56] References Cited

U.S. PATENT DOCUMENTS

| | | | |
|---|---|---|---|
| 2,658,808 | 11/1953 | Kaiser | 277/208 |
| 2,844,423 | 1/1957 | Arnold | 277/168 |
| 2,983,529 | 5/1961 | Price | 277/208 |
| 3,600,045 | 8/1971 | Inoue | 277/173 X |
| 3,814,445 | 6/1974 | Bitzan | 277/165 |
| 4,103,594 | 8/1978 | Geffroy | 277/170 X |
| 4,346,685 | 8/1982 | Fujikawa | 277/170 X |
| 4,351,227 | 9/1982 | Copp, Jr. et al. | 92/71 |
| 4,466,624 | 8/1984 | Pantigati | 277/171 |
| 4,629,200 | 12/1986 | Ruddy | 277/216 |
| 4,676,143 | 6/1987 | Nomura et al. | 277/171 X |
| 4,714,259 | 12/1987 | Mack et al. | 277/165 |
| 4,877,257 | 10/1989 | Ide | 277/206 A |
| 4,928,577 | 5/1990 | Stoll | 277/165 X |

FOREIGN PATENT DOCUMENTS

| | | | |
|---|---|---|---|
| 0494123 | 5/1919 | France | 277/171 |
| 888513 | 12/1943 | France | 285/95 |

Primary Examiner—William A. Cuchlinski, Jr.
Assistant Examiner—James K. Folker
Attorney, Agent, or Firm—Burgess, Ryan & Wayne

[57] ABSTRACT

A piston for a compressor comprising a ring groove on the outer circumferential surface of the piston, and a discontinuous ring seal member with opposite split ends made of a plastic material and fitted in the ring groove. The ring member having an outer surface comprising a main sealing portion having an axially uniform shape and an outwardly circumferentially projecting flexible lip portion. Also, the inner surface of the ring member comprises an inner bearing portion able to come into contact with a first portion of a bottom surface of the ring groove such that the flexible lip portion of the outer surface is brought into contact with a cylinder wall of the cylinder bore and preflexed inwardly. An inner pressure receiving portion is formed adjacent to the inner bearing portion to receive pressure from the compression chamber, to further flex the flexible lip portion upon a compression stroke of the compressor and thereby allow the ring member to expand and the main sealing portion to come into contact with the cylinder wall of the cylinder bore.

5 Claims, 2 Drawing Sheets

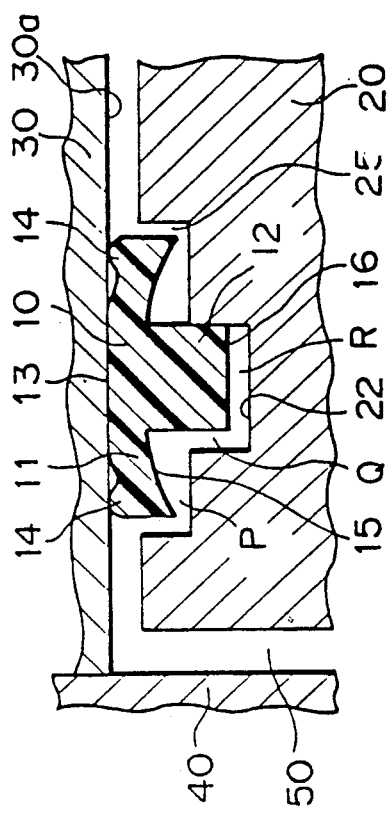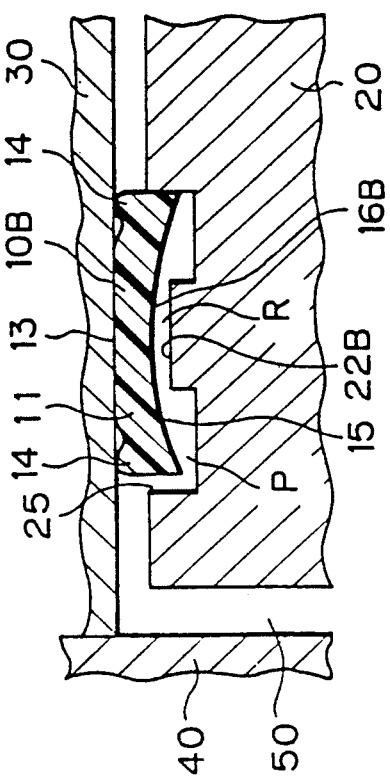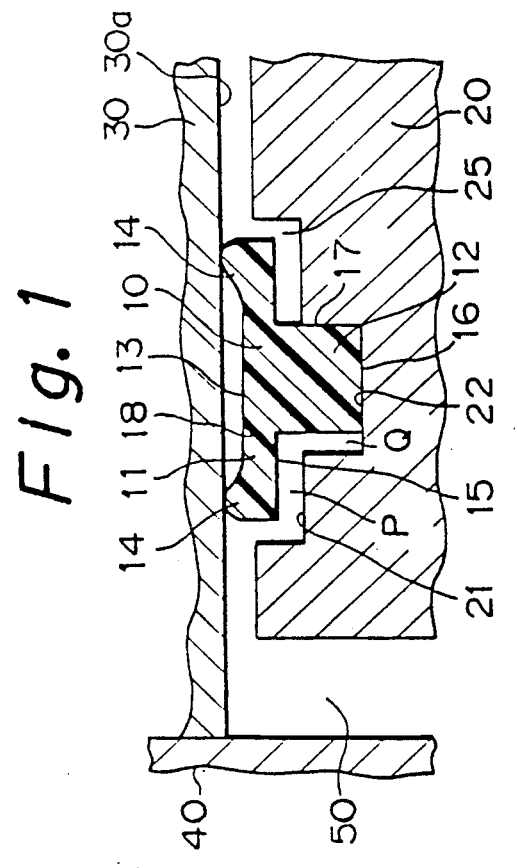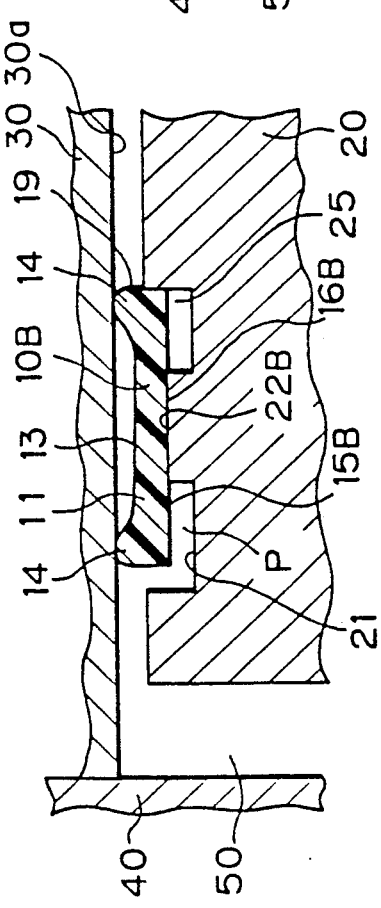

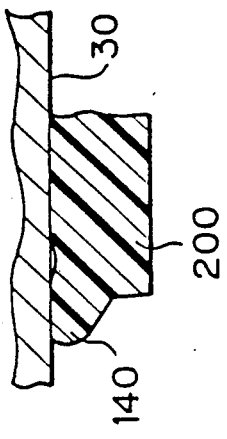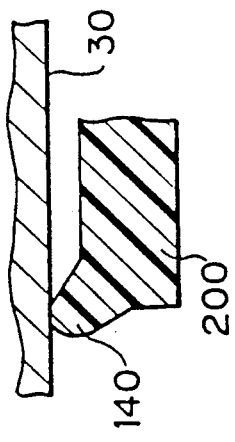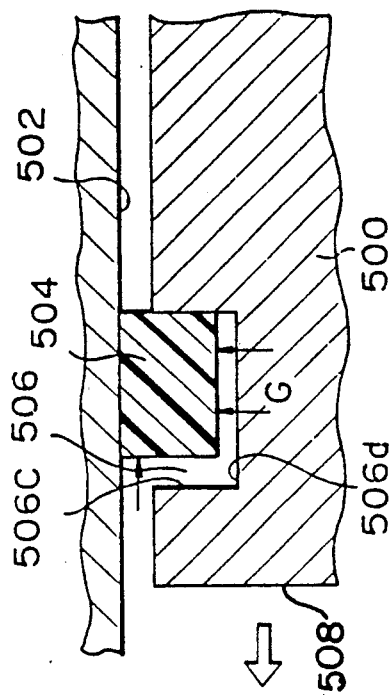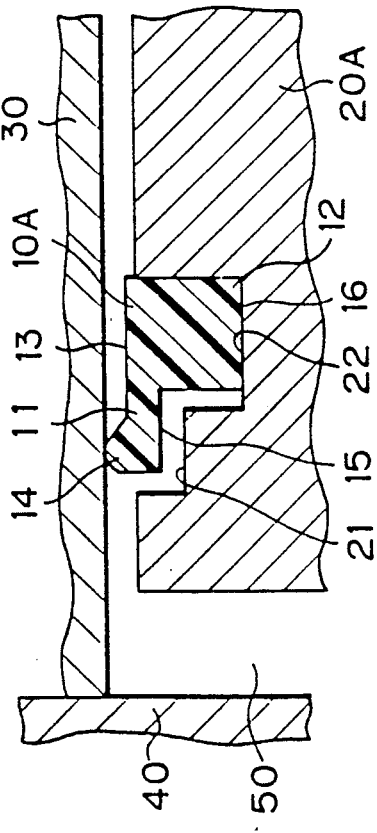

SEALING ARRANGEMENT FOR PISTON IN COMPRESSOR

BACKGROUND OF THE INVENTION

1. Field of the Invention

The present invention relates to a piston having a discontinuous seal ring and used in a compressor, and in particular, relates to an improvement of a sealing function at an initial stage of a compression stroke in a compressor using reciprocable pistons.

2. Description of the Related Art

In a compressor using reciprocable pistons, such as a crank shaft type compressor, a swash plate type compressor, and an oscillating plate type compressor used in particular in an air conditioning system of an automobile, many proposals have been made with regard to reducing the size of the compressor. To accomplish this, the cylinder block and piston are made from an aluminum alloy, and in the design of such an aluminum alloy compressor a relatively large clearance between the piston and the cylinder bore has been adopted, to avoid scouring due to a sliding engagement between the aluminum alloy parts, and in this case, a piston ring made of a plastic material is often used to seal a gap between intersliding parts. Such a piston ring usually has a rectangular cross-section conforming to the shape of a ring groove on the outer surface of the piston, and is a discontinuous ring having opposite ends which meet when the piston ring is circumferentially compressed.

An example of a conventional piston is shown in FIG. 7 of the attached drawings, in which a piston 500 is fitted in a cylinder bore 502 to form a compression chamber 508 on at least one side of the piston 500, and a piston ring 504 is inserted in a ring groove 506 with side surfaces 506c and a bottom surface 506d, so that clearances are provided between one of the side surfaces 506c of the ring groove 506 and the end surface of the piston ring 504, and between the bottom surface 506d of the ring groove 506 and the inner surface of the piston ring 504, when the piston 500 moves in the direction of the arrow F during the compression stroke of the compressor. The pressure generated in the compression chamber 508 is introduced to these clearances in the ring groove 506 and thereby applies a back pressure to the piston ring 500, as shown by the arrow G, to cause the discontinuous piston ring 504 to expand and come into closer contact with the wall of the cylinder bore 502.

The initial shape of such a discontinuous piston ring 504 is usually slightly larger than the internal shape of the cylinder bore 502 and is inserted in the cylinder bore 502 under an initial tension, and thus the piston ring 504 should be in close contact with the inner wall of the cylinder bore 502. The piston ring 504 made of a plastic material, however, is not as stiff as a piston ring made of a metal, as often used in an internal combustion engine, and the initial tension of the plastic piston ring 504 is weak. Accordingly, the design is such that the pressure G from the compression chamber 508 presses the piston ring 500 into closer contact with the wall of the cylinder bore 502, as described above, and the action of the pressure G of pressing the piston ring 500 into closer contact the wall of the cylinder bore 502 is important to the establishing of a good sealing by the plastic piston ring 504. Nevertheless, the pressure in the compression chamber varies in accordance with the position of the piston 500, and in particular, the pressure is weak at an initial stage of the compression stroke of the piston 500, and thus the pressure G does not act to sufficiently expand the plastic piston ring 504 until the pressure G is increased to a much higher level. Accordingly, a problem of the sealing capability arises at the initial stage of the compression stroke in a compressor, and of a loss of compression stemming therefrom.

SUMMARY OF THE INVENTION

An object of the present invention is to provide a sealing arrangement for a piston having a discontinuous sealing ring and used in a compressor, in which the sealing ring can ensure a good sealing function at any stage of the compression stroke of the compressor, to thereby improve a volumetric efficiency of the compressor.

According to the present invention, there is provided a sealing arrangement for a piston in a compressor having a cylinder block with a cylinder bore formed therein to axially displaceably accommodate the piston, and a cylinder head attached to the cylinder block for forming a compression chamber on one side of the piston. The sealing arrangement comprises means for forming a ring groove on an outer surface of the piston, the ring groove comprising opposite side surfaces and a bottom surface between the side surfaces; a discontinuous ring seal member made of a plastic material and fitted in the ring groove; the ring member having a main sealing portion with an main sealing outer surface and a flexible lip portion arranged on the side of the cylinder head away from the main sealing portion and outwardly circumferentially projecting from the main sealing outer surface; the ring member also having an inner surface comprising an inner bearing portion able to come into contact with a first cylindrical portion of the bottom surface of said ring groove in such a manner that the flexible lip portion of the outer surface is pressed into contact with the inner surface of the cylinder bore and prestressed inwardly when the inner bearing portion bears on the first portion of the bottom surface of the ring groove and an inner pressure receiving portion contiguous to the inner bearing portion, such that the inner pressure receiving portion faces a second cylindrical portion of the bottom surface of the ring groove adjacent to the first portion and provides a clearance between the inner pressure receiving portion and the second portion, while the inner bearing portion bears on the first portion of the bottom surface of the ring groove to receive a pressure from the compression chamber, to thereby allow the ring member to expand and the main sealing outer surface to come into contact with the cylinder wall of the cylinder bore.

With this arrangement, when the piston is inserted in the cylinder bore, the inner bearing portion of the inner surface of the ring member bears the first cylindrical portion of the bottom surface of the ring groove and the ring member is no longer compressed. The outer surface of the flexible lip portion is caused to come into contact with the inner surface of the cylinder bore and prestressed inwardly, and thus the flexible lip portion fills a gap between the cylinder bore and the piston and a good seal is ensured by a reaction force by the prestressed ring member even when the compressor is not operated. When the compressor begins to operate and a relatively weak compression pressure is applied to the ring member at an initial stage of the compression stroke of the compressor, the sealing function can be similarly maintained by the flexible lip portion of the ring member, although a flexure of the flexible lip portion may change to some slight extent. In this case, the compression pressure, which may be directly applied to the end surface of the ring member on the side of the compression chamber, will urge the ring member in the direction opposite to the preflex direction of the flexible lip portion, to thereby increase the sealing capability. Then as the compression pressure increases, the inner pressure receiving portion will be expanded by the increasing compression pressure, inducing a simultaneous expansion of the adjacent inner bearing portion to thus lift same from the first portion of the bottom of the ring groove. Therefore, the main sealing portion is expanded and brought completely into contact with the cylinder wall of the cylinder bore, and thus the sealing engaging area is increased to provide an enhanced sealing function.

BRIEF DESCRIPTION OF THE DRAWINGS

The present invention will become more apparent from the following description of the preferred embodiment with reference to the accompanying drawings; in which:

FIG. 1 is a partial cross-sectional view of a sealing arrangement for a piston in a compressor according to the first embodiment of the present invention, in the condition such that the compressor is outputting a low compression pressure;

FIG. 2 is a view similar to FIG. 1, but in the condition such that the compressor is outputting a relatively high compression pressure;

FIG. 3 is a partial cross-sectional view of a sealing arrangement according to the second embodiment of the present invention;

FIG. 4A is a partial cross-sectional view of a modified seal ring, with the sealing ring prestressed;

FIG. 4B is a partial cross-sectional view of the seal ring of FIG. 1, with the seal ring further flexed;

FIG. 5 is a partial cross-sectional view of a sealing arrangement according to the third embodiment of the present invention, in the condition such that the compressor is outputting a low compression pressure;

FIG. 6 is a view similar to FIG. 5, but in the condition such that the compressor is outputting a relatively high compression pressure; and FIG. 7 is a view of a conventional sealing arrangement.

DESCRIPTION OF THE PREFERRED EMBODIMENTS

FIGS. 1 and 2 show a part of a compressor which includes a cylinder block 30 with a cylinder bore 30a and a piston 20 axially displaceably inserted in the cylinder bore 30a. The piston 20 has a ring groove 25 on an outer surface thereof in which a sealing ring 10 is fitted, and a cylinder head 40 is attached to the cylinder block 30 to form a compression chamber 50 on one side of the piston 20. An additional cylinder head may be attached to the cylinder block 30 to form an additional compression chamber on other side of the piston 20, in a known manner.

The sealing ring 10 is made from a plastic material such as polytetrafluoroethylene and is in the form of a discontinuous ring having opposite ends (not shown) whereby the sealing ring 10 can be compressed or expanded. As shown in FIG. 1, the sealing ring 10 has an outer cylindrical portion 11 having a width greater than that of a generally used sealing ring, and an inner cylindrical leg portion 12. The sealing ring 10 is thus formed in a T-shaped cross-section. The outer surface of the outer cylindrical portion 11 constitutes a main sealing outer surface 13. Flexible lip portions 14 are arranged on either end of the outer cylindrical portion 11 and circumferentially project outward from the main sealing outer surface 13, respectively. The thickness of the outer cylindrical portion 11 is such that the flexible lip portions 14 can be adequately flexed.

The sealing ring 10 has a stepped inner surface including cylindrical portions 15 and 16, and the ring groove 25 on the piston 20 has a correspondingly stepped inner surface including cylindrical portions 21 and 22. In the embodiment, the cylindrical portion 16 comprises an inner surface of the inner cylindrical leg portion 12, and an additional inner surface portion is provided on the right side of the central cylindrical portion 16 in addition to the left side cylindrical portion 15. Note, the left side cylindrical portion 15, located near the compression chamber 50, is important in the present invention, and thus a detailed description of the right side cylindrical portion is omitted.

The cylindrical portion 15 is generally located in a region corresponding to the left side flexible lip portion 14, and constitutes an inner pressure receiving portion facing the second cylindrical portion 21 of the bottom surface of the ring groove 25 to provide a clearance P therebetween. The cylindrical portion 16 comprising the inner surface of the inner cylindrical leg portion 12 constitutes an inner bearing portion able to come into contact with the first cylindrical portion 22 of the bottom surface of the ring groove 25. The inner cylindrical leg portion 12 also has opposite side surfaces 17 and 18. When the piston 20 is moved to the left for the compression operation, the bottom side surface 17 is abutted against the opposite side surface of the bottom of the ring groove 25 to bear an axial thrust of the sealing ring 10, and a clearance Q is generated between the head side surface 18 and the opposite side surface of the bottom of the ring groove 25, similar to the clearance P created by the left side inner pressure receiving portion 15.

As can be understood, when the piston 20 is inserted in the cylinder bore 30a, the inner bearing portion 16 of the sealing ring 10 bears on the first cylindrical portion 22 of the bottom surface of the ring groove 25 and cannot be further compressed. Thus the outer surface of the flexible lip portion 14 is brought into contact with the inner surface of the cylinder bore 30a and prestressed inwardly, and thus the flexible lip portion 14 fills a gap between the cylinder bore 30a and the piston 20. Therefore, a good seal is ensured by a reaction force due to the prestressed flexible sealing ring 10, from the initial stage of the assembly of the compressor.

When the compressor begins to operate and a relatively weak compression pressure is applied to the inner pressure receiving portion 15 of the sealing ring 10 at an initial stage of the compression stroke of the compressor, the sealing function can be similarly maintained by the flexible lip portion 14 of the sealing ring 10 although a flexure of the flexible lip portion 14 may change slightly. As shown in FIG. 2, as the compression pressure increases and is introduced to the clearance P under the inner pressure receiving portion 15, the inner pressure receiving portion 15 is expanded by the increasing compression pressure, inducing a simultaneous expansion of the adjacent inner bearing portion 16, which is thus lifted from the first portion 22 of the bottom of the ring groove 25. Therefore, a further clearance R is created between the inner bearing portion 16 and the first portion 22 of the bottom of the ring groove 25, into which the compression pressure is introduced, so that the sealing ring 10 is fully expanded and the main sealing outer surface 13 in complete contact with the cylinder wall of the cylinder bore 30a, with the flexible lip portion 14 further flexed relative to the main sealing outer surface 13. Accordingly, the sealing engaging area is increased to provide an enhanced sealing function.

FIG. 3 shows the second embodiment of the present invention, which includes a sealing ring 10A similar to that in which a part of the sealing ring 10 of the first embodiment is cut along a plan of a side surface of the inner cylindrical leg portion 12, i.e., the sealing ring 10A has only one flexible lip portion 14 on the side of the compression chamber 50 and a right side portion of the ring groove 25 of the first embodiment is correspondingly narrowed. In the second embodiment, as in the first embodiment, a sealing function is ensured mainly by the flexible lip portion 14 while the compression pressure is low, and then by the main sealing outer surface 13 brought into complete contact with the cylinder wall of the cylinder bore 30a as the compression pressure increases.

The flexible lip portion can be made in various shapes, although the flexing of the flexible lip portion 14 is provided mainly by the elasticity of the outer cylindrical portion 11. For example, as shown in FIG. 4A, it is possible to make the flexible lip portion 140 itself elastic, so that it is elastically deformed when the sealing ring 200 is expanded by a relatively high compression pressure in the clearances P, Q, and R, as shown in FIG. 4B.

FIGS. 5 and 6 show the third embodiment of the present invention. The sealing ring 10B comprises an outer cylindrical portion 11 having a width greater than that of a usual sealing ring. The outer surface of the outer cylindrical portion 11 constitutes a main sealing outer surface 13 and outwardly projecting flexible lip portions 14 are arranged on either end of the outer cylindrical portion 11. The thickness of the outer cylindrical portion 11 is selected so that the flexible lip portions 14 are able to flex.

The sealing ring 10B has a uniform inner surface which still includes the inner bearing portion 16B and the inner pressure receiving portion 15B. The ring groove 25 of the piston 20 has a stepped inner surface including cylindrical portions 21 and 22B, and the first cylindrical portion 22B projects from the second cylindrical portion 21. The inner pressure receiving portion 15B is generally located in correspondence to the flexible lip portion 14 and faces the second cylindrical portion 21 of the bottom surface of the ring groove 25 to provide a clearance P therebetween. The inner bearing portion 16B is generally located in correspondence to the main sealing outer surface 13 and able to come into contact with the projecting first cylindrical portion 22B of the bottom surface of the ring groove 25. In this embodiment, the bottom side surface 19 of the sealing ring 10B abuts against the opposite side surface of the ring groove 25 to bear an axial thrust of the sealing ring 10B when the piston 20 is moved to the left for the compression operation.

In the operation of this embodiment, when the piston 20 is inserted in the cylinder bore 30a, the inner bearing portion 16B of the sealing ring 10B bears on the first cylindrical portion 22B of the bottom surface of the ring groove 25 and cannot be further compressed. Thus the outer surface of the flexible lip portion 14 is caused to come into contact with the inner surface of the cylinder bore 30a and is prestressed inwardly, and thus the flexible lip portion 14 fills a gap between the cylinder bore 30a and the piston 20. Therefore, a good seal is ensured by an reaction force due to the prestressed flexible sealing ring 10B, from the initial stage of assembly the compressor.

When the compressor begins to operate and a relatively weak compression pressure is applied to the inner pressure receiving portion 15B of the sealing ring 10B at an initial stage of the compression stroke of the compressor, the sealing function can be similarly maintained by the flexible lip portion 14 of the sealing ring 10B although a flexure of the flexible lip portion 14 may change slightly. As shown in FIG. 6, as the compression pressure is increased and is introduced to the clearance P under the inner pressure receiving portion 15B, the inner pressure receiving portion 15B and the inner bearing portion 16B are expanded so that the compression pressure is introduced in the clearance R between the inner bearing portion 16B and the first portion 22B of the bottom of the ring groove 25, and thus the sealing ring 10B is fully expanded and the main sealing outer surface 13 comes into complete contact with the cylinder wall of the cylinder bore 30a with the further flexed flexible lip portion 14. Accordingly, the sealing capability is increased as in the previous embodiments.

As explained above, it is possible to ensure a good sealing function throughout the entire compression stroke, and to considerably improve the volumetric efficiency of the compressor, according to the present invention in which the sealing function of the intersliding area can be ensured by the prestressed flexible lip portion provided on the sealing ring 10B at an initial stage of the compression stroke of the compressor, and as the compression pressure is increased, the sealing ring is fully expanded by the introduced compression pressure and substantially the entire outer surface thereof, including the main sealing surface, provides the sealing function.

We claim:

1. A sealing arrangement for a piston in a compressor having a cylinder block with a cylinder bore having an inner surface, formed therein to axially displaceably accommodate said piston, and a cylinder head attached to said cylinder block for forming a compression chamber on one side of said piston, the sealing arrangement comprising:

a ring groove on an outer surface of said piston and comprising opposite side surfaces and a bottom surface between the side surfaces having first and second adjacent cylindrical portions; and a discontinuous ring seal member made of a plastic material and fitted in said ring groove and comprising, a main sealing portion having a main sealing outer surface and a pair of flexible lip portions arranged on opposed sides of said main sealing portion and outwardly circumferentially projecting from said main sealing outer surface, an inner surface comprising an inner bearing portion adapted to contact said first cylindrical portion of said bottom surface of said ring groove whereby said flexible lip portions contact the inner surface of said cylinder bore and are prestressed inwardly when said inner bearing portion contacts said first cylindrical portion, and an inner pressure receiving portion contiguous with said inner bearing portion wherein said inner pressure receiving portion faces said second cylindrical portion and provides a clearance between said inner pressure receiving portion and said second cylindrical portion while said inner bearing portion contacts said first cylindrical portion to receive pressure from said compression chamber, to thereby allow said ring seal member to expand and said main sealing outer surface to contact the inner surface of the cylinder bore.

2. A piston according to claim 7, wherein said inner bearing portion expands and provides a further clearance between said inner bearing portion and said first cylindrical portion of the bottom surface of said ring groove.

3. A piston according to claim 2, wherein said inner surface of said ring member is stepped such that said inner bearing portion inwardly circumferentially projects from said inner pressure receiving portion.

4. A piston according to claim 3, wherein the bottom surface of said ring groove is stepped such that said first cylindrical portion bearing said inner bearing portion is inwardly circumferentially lower than said adjacent second portion.

5. A piston according to claim 2, wherein said inner surface of said ring member has a uniform inner diameter along the length thereof, and the bottom surface of said ring groove is stepped such that said first cylindrical portion bearing said inner bearing portion outwardly circumferentially projects from said second cylindrical portion.

* * * * *